(12) United States Patent
Hsin

(10) Patent No.: US 7,535,805 B2
(45) Date of Patent: May 19, 2009

(54) SYSTEM AND METHOD FOR DETECTING THE LOCATION OF AN OPTICAL PICK-UP HEAD

(75) Inventor: Kuo-Ting Hsin, Hsin-Chu Hsien (TW)

(73) Assignee: MediaTek Inc., Hsin-Chu Hsien (TW)

( * ) Notice: Subject to any disclaimer, the term of this patent is extended or adjusted under 35 U.S.C. 154(b) by 611 days.

(21) Appl. No.: 11/381,362

(22) Filed: May 3, 2006

(65) Prior Publication Data
US 2007/0258338 A1 Nov. 8, 2007

(51) Int. Cl.
*G11B 7/00* (2006.01)
(52) U.S. Cl. ............ 369/44.28; 369/44.27; 369/53.2; 369/53.28
(58) Field of Classification Search .......... None
See application file for complete search history.

(56) References Cited

U.S. PATENT DOCUMENTS

| | | | |
|---|---|---|---|
| 5,694,382 A * | 12/1997 | Oliver et al. | 369/53.24 |
| 5,933,410 A | 8/1999 | Nakane et al. | |
| 6,333,902 B1 | 12/2001 | Shim | |
| 6,801,484 B2 | 10/2004 | Wang | |
| 7,245,573 B2 * | 7/2007 | Eom | 369/53.34 |

FOREIGN PATENT DOCUMENTS

| | | |
|---|---|---|
| CN | 1233043 | 10/1999 |
| CN | 1553438 | 12/2004 |

\* cited by examiner

*Primary Examiner*—Muhammad N. Edun
(74) *Attorney, Agent, or Firm*—Winston Hsu (57) ABSTRACT

Disclosed is a system for detecting a location of an optical pick-up head on an optical disk, and the optical disk comprises a plurality of sectors and the optical pick-up head emitting light to the optical disk and detected the reflected light from the optical disk. The system comprises: a signal generator, a counter, and a processing unit. The signal generator is coupled to the optical pick-up head for receiving a detecting signal from the optical pick-up head to generate a sector determined signal. The counter is coupled to the signal generator for receiving the sector determined signal and a period determined signal for counting a number according to the sector determined signal and the period determined signal; and a processing unit for receiving the number and calculating the location of the optical pick-up head accordingly.

22 Claims, 12 Drawing Sheets

SYSTEM AND METHOD FOR DETECTING THE LOCATION OF AN OPTICAL PICK-UP HEAD

BACKGROUND

Conventionally, a DVD-RAM disk includes data separated on a plurality of tracks, where if more than one track will be read, a track jump process should be performed. The operations of the track jump process include seeking, tracking, and following operations.

Figure 1:
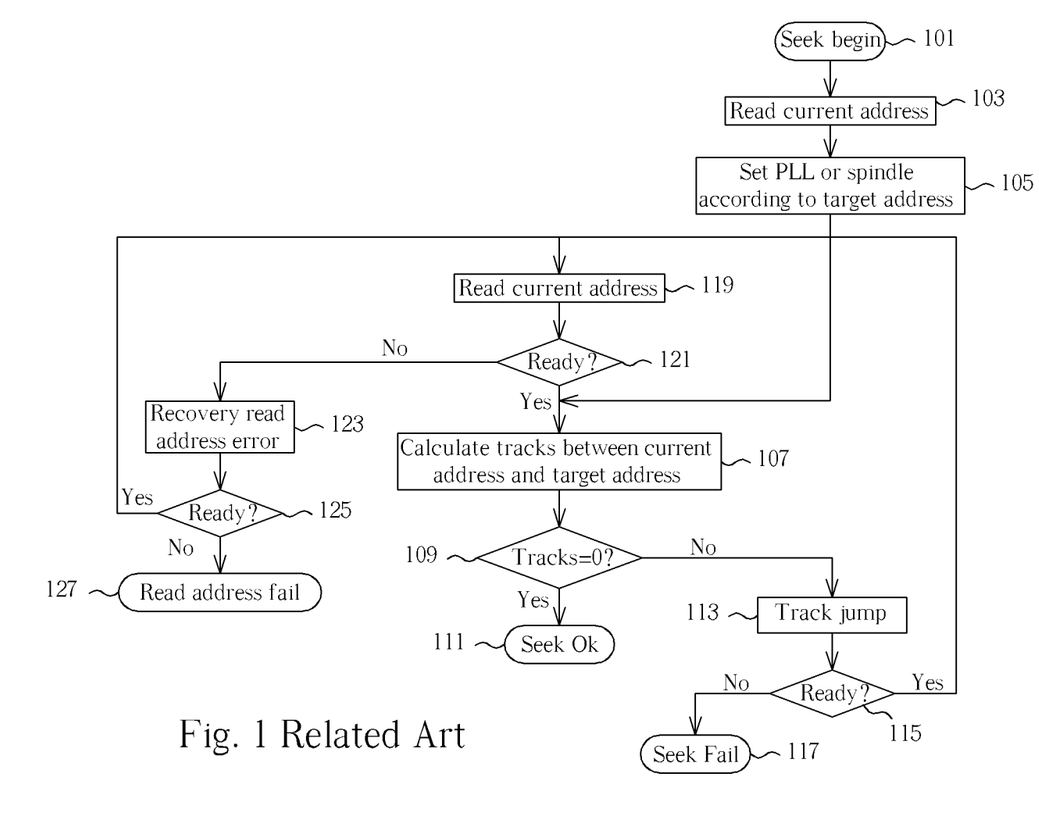
FIG. 1 is a flow chart illustrating the steps of a related art seeking method.

FIG. 1 is a flow chart illustrating a related art seeking method. As shown in FIG. 1, Step 101, the seeking method begins. Step 103, reads current address. Step 105, set a PLL circuit or spindle speed according to the address of the target which the optical pick up head will move to. Step 107, calculates the tracks between the current address and the target address. Step 109, check if the track is 0 or not, if yes, enter step 111, which indicates that seeking is completed, if no, enter step 113 to perform a track jumping. After step 113, enter step 115 to see if it is ready or not, if no, enter step 117, which indicates that seeking is failed, if yes, go to step 119 to read current address. Then step 121, check if it is ready or not, if yes, enter step 107, if no, go to step 123 to recovery the error of reading address. After that, go to step 125 to check if it is ready, if yes, go to step 119, if no, go to step 127, which indicates that the reading of address fails.

As shown, in order to increase the data reading efficiency of Physical Identification (PID) of a DVD-RAM disk after a track-jump, the spindle speed and the frequency of a PLL clock are always pre-determined according to the target zone in which the target address locates. In this way, the PLL only needs time to lock the phase in order for the PID to be read quickly. Sometimes, however, the tracking and following operation after the seeking operation may encounter some unexpected errors, and therefore the optical pick-up head slips to an erroneous address. If the erroneous address in which the optical pick-up head locates is near the target zone, the difference between the pre-set PLL frequency and the channel bit frequency associated with the zone in which the optical pick-up head locates is also small, such that the PLL is capable of locking the correct phase under the pre-set PLL frequency and spindle speed described above. In this way, the erroneous address can be read, and then the seeking operation can be performed again to move the optical pick-up head from the erroneous address to the target address.

If the erroneous address is far away from the target zone, the PLL will require a long period of time to lock the correct phase, or will fail to lock the correct phase under the pre-set PLL frequency and spindle speed described above. In this situation, the related art moves the optical pick-up head back to a servo-on area in the inner track of the optical disk, zone 0 for example, and sets the spindle speed and the PLL frequency corresponding to the inner tack. The location of the optical pick-up head in the inner track can be read and then the track-jump process can be performed again to move the optical pick-up head to the target address. This related art procedure is time-consuming, and degrades the disk drive performance.

Another related art method for detecting the location of the optical pick-up head utilizes a stepping motor and a step index. If, however, the stepping motor does not operate as desired, the step index can not indicate the location of the optical pick-up head correctly.

In short, a novel scheme, having a superior performance to related art methods, of detecting the position of an optical pick-up head is needed to solve these aforementioned problems.

SUMMARY

According to the claimed invention, a system for detecting a location of an optical pick-up head on an optical disk is disclosed, and the optical disk comprises a plurality of sectors and the optical pick-up head emitting light to the optical disk and detected the reflected light from the optical disk. The system comprises: a signal generator, a counter, and a processing unit. The signal generator is coupled to the optical pick-up head for receiving a detecting signal from the optical pick-up head to generate a sector determined signal. The counter is coupled to the signal generator for receiving the sector determined signal and a period determined signal for counting a number according to the sector determined signal and the period determined signal; and a processing unit for receiving the number and calculating the location of the optical pick-up head accordingly. The sector determined signal can be a signal indicating a sector of the optical disk, for example, the sector determined signal is an IDGATE signal for DVD-RAM.

Also, the optical disk can comprise a plurality of groove tracks and land tracks. The groove tracks and the land tracks are spaced therein between. The period determined signal is a G/L signal for determining an interface between a land track and a groove track, and the counter receives the G/L signal and counts the number of the sectors in a revolution of a current groove/land track.

Besides, the above system further includes a motor rotating signal generator for sensing the operation of a motor for rotating the optical disk to generate a Frequency Generator (FG) signal as the period determined signal, and the FG signal is used for determining that the optical disk rotates one revolution and the counter receives the FG signal and counts the number of the sectors in a revolution.

Additionally, the period determined signal can be a reference clock signal which has a predetermined frequency, and the counter receives the clock signal and counts the number of the clocks in a sector determined by the sector determined signal.

Furthermore, the period determined signal is a reference clock signal which has a predetermined frequency and the sector determined signal is a wobble signal for determining at least a period of the reference clock signal, and the counter receives the wobble signal and the reference clock signal to counts the number of the clocks in the period of the reference clock signal.

According to the claimed invention, a method for detecting a location of an optical pick-up head on an optical disk is also disclosed, wherein the optical disk comprises a plurality of sectors, and the optical pick-up head emits light to the optical disk and detects the reflected light from the optical disk. The method comprises: (a) receiving a detecting signal from the optical pick-up head to generate a sector determined signal; (b) counting a number according to the sector determined signal and a period determined signal; and (c) receiving the number and calculating the location of the optical pick-up head accordingly.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 (a) is a block diagram illustrating a system 300 for detecting the location of the optical pick up head according the embodiment of the present invention.

FIG. 3 (b) is flow chart illustrating the steps of a method for detecting the location of the optical pick up head, wherein the method corresponds to the system 300 shown in FIG. 3.

FIG. 4 (a) is a block diagram illustrating a system for detecting the location of the optical pick up head according to the first embodiment of the system shown in FIG. 3 (a) and the method shown in FIG. 3 (b).

FIG. 5 (a) is a block diagram illustrating a system for detecting the location of the optical pick up head according to the second embodiment of the system shown in FIG. 3 (a) and the method shown in FIG. 3 (b).

FIG. 5 (b) is a schematic diagram illustrating the signals and the operation of which corresponding to the system shown in FIG. 5 (a).

FIG. 6 (a) is a block diagram illustrating a system for detecting the location of the optical pick up head according to the third embodiment of the system shown in FIG. 3 (a) and the method shown in FIG. 3 (b).

FIG. 6 (b) is a schematic diagram illustrating the signals and the operation of which corresponding to the system shown in FIG. 6 (a).

FIG. 7 (a) is a block diagram illustrating a system for detecting the location of the optical pick up head according to the forth embodiment of the system shown in FIG. 3 (a) and the method shown in FIG. 3 (b).

FIG. 7 (b) is a schematic diagram illustrating the signals and the operation of which corresponding to the system shown in FIG. 7 (a).

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . .". Also, the term "couple" is intended to mean either an indirect or direct electrical connection. Accordingly, if one device is coupled to another device, that connection may be through a direct electrical connection, or through an indirect electrical connection via other devices and connections.

Figure 2:
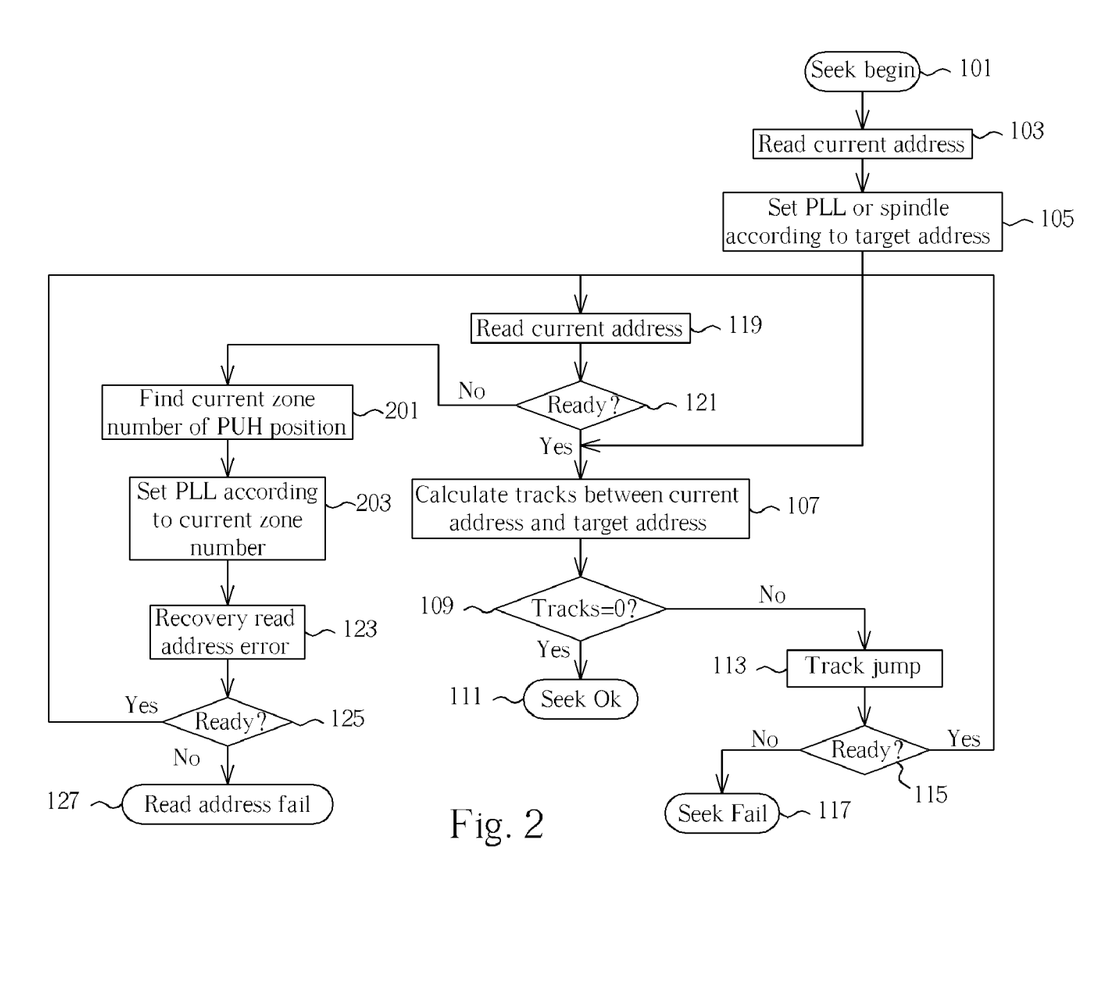
FIG. 2 is flow chart indicating the steps of a modified method according to the present invention.

FIG. 2 is flow chart indicating the steps of a modified method according to the present invention. As shown in FIG. 2, some steps of the method according to the present invention are the same as which of the related art method shown in FIG. 1. The difference between the method shown in FIG. 1 and FIG. 2 is that the method in FIG. 2 further includes steps 201, 203. Step 201 determines the location of optical pick up head, that is, find the number of the zone on which the pick up head is located on, and step 203, set PLL frequency and spindle speed according to the zone number determined in the step 201. The system and method for performing the step 201 and 203 are described as below.

Figure 3A:
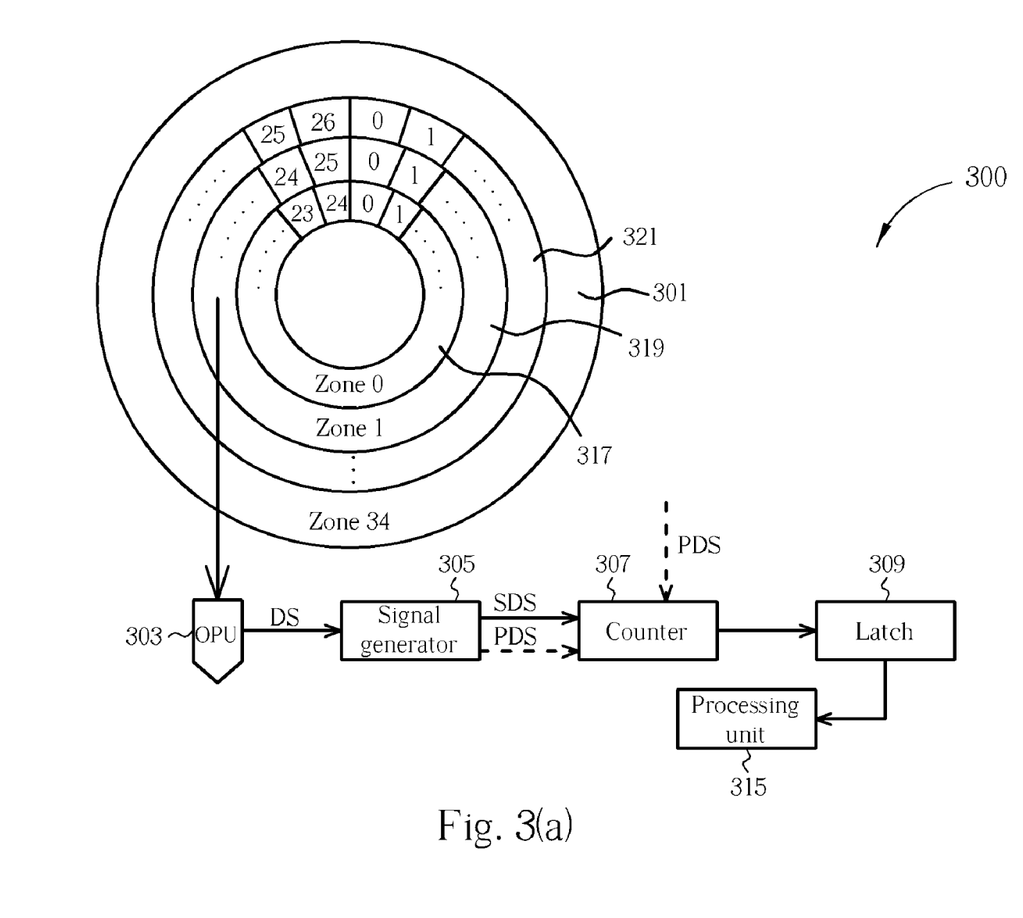

FIG. 3 (a) is a block diagram illustrating a system 300 for detecting the location of the optical pick up head according the embodiment of the present invention. As shown in FIG. 3, the system 300 includes an optical pick up head 303, a signal generator 305, a counter 307, a latch 309, and a processing unit 315. The signal generator 305 is used for receiving a detecting signal DS from the optical pick-up head 303 to generate a sector determined signal SDS. The counter 307 receives the sector determined signal SDS and a period determined signal PDS with a predetermined period for counting a number V (not shown in FIG. 3 (a)) according to the sector determined signal SDS and the period determined signal PDS. The latch 309 is used for latching the number V that the counter 307 counts. The processing unit 315 is used for receiving the number V from the latch 309 and calculating the location of the optical pick-up head 303 accordingly.

According to the preferred embodiments of the present invention, the sector determined signal SDS can be a signal indicating the sectors of the optical disk 301 or a wobble signal, wherein the detecting signal DS changes corresponding to different sector determined signal SDS, and the period determined signal PDS can be a G/L signal indicating an interface between a land track and a groove track, a Frequency Generator (FG) signal for determining that the optical disk rotates one revolution or a reference clock signal. The operation corresponding to the different sector determined signal SDS and the period determined signal PDS are shown as below.

Figure 3B:
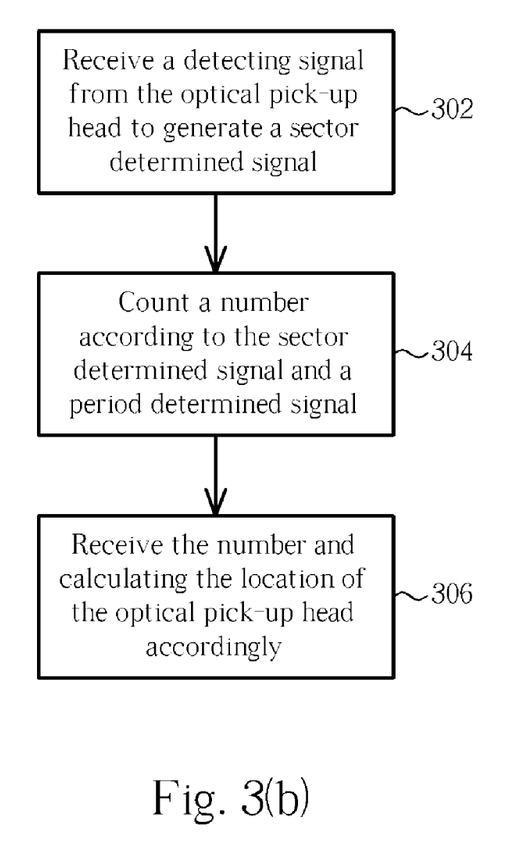

FIG. 3 (b) is flow chart illustrating the steps of a method for detecting the location of the optical pick up head, and the method corresponds to the system 300 shown in FIG. 3. The method includes:

Step 302: Receive a detecting signal from the optical pick-up head to generate a sector determined signal SDS.

Step 304: Count a number according to the sector determined signal and a period determined signal PDS.

Step 306: Receive the number and calculating the location of the optical pick-up head accordingly.

Figure 4A:
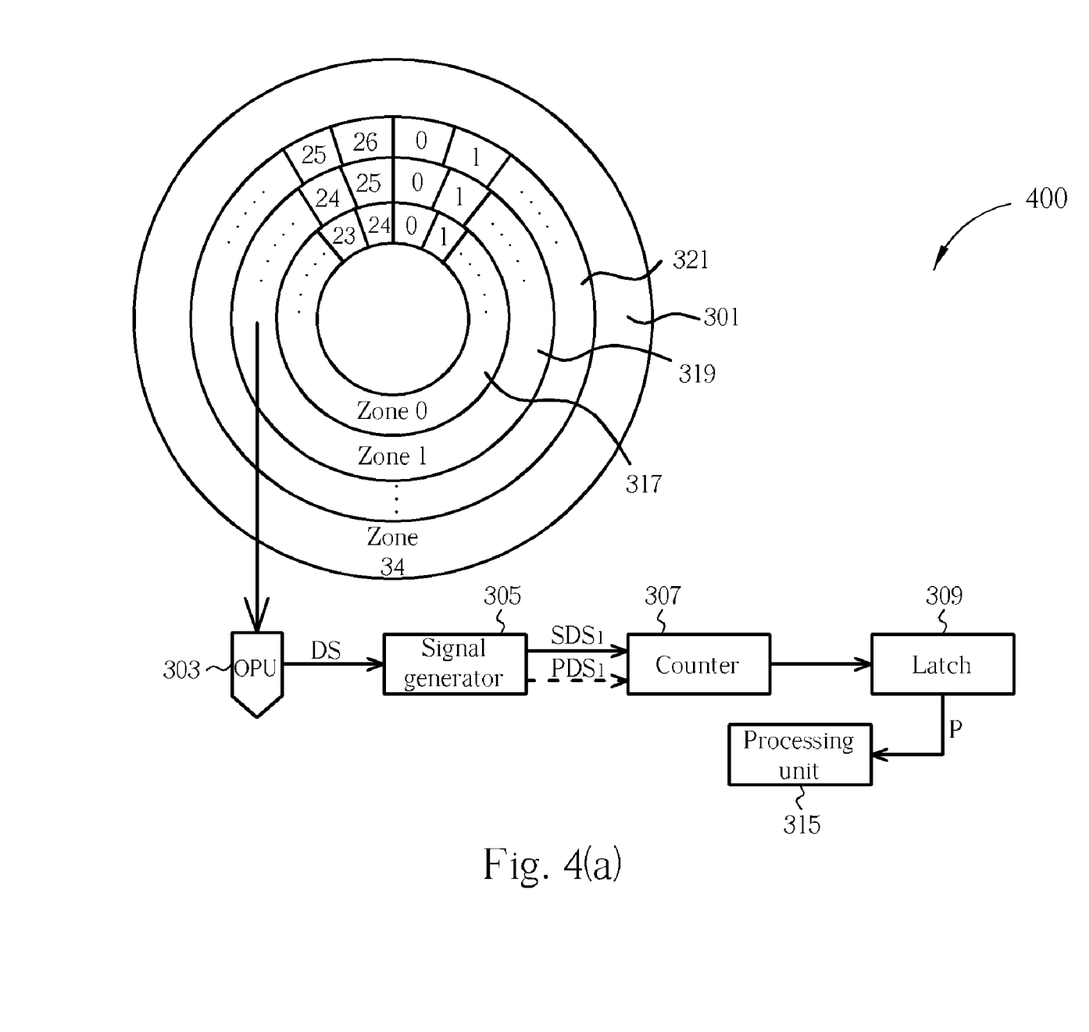
Figure 4B:
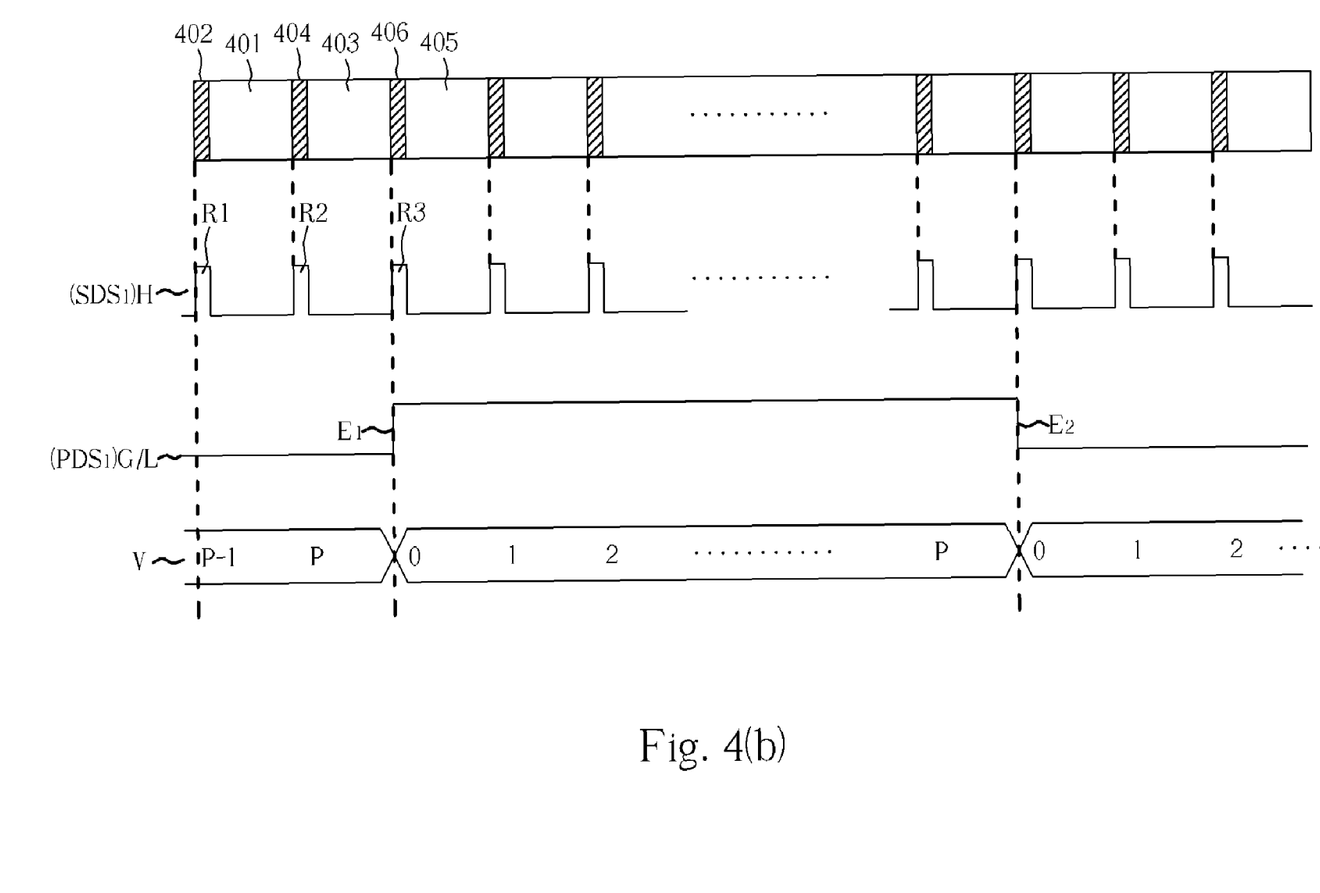
FIG. 4(b) is a schematic diagram illustrating the signals and the operation of which corresponding to the system shown in FIG. 4(a).

FIG. 4 (a) is a block diagram illustrating a system 400 for detecting the location of the optical pick up head according to the first embodiment of the system shown in FIG. 3 (a) and the method shown in FIG. 3 (b). FIG. 4(b) is a schematic diagram illustrating the signals and the operation of which corresponding to the system 400 shown in FIG. 4(a). Please jointly refer to FIG. 4(a) and FIG. 4(b) to understand the present invention more clearly.

As shown in FIG. 4(a) and FIG. 4(b), the sector determined signal $SDS_1$ is a header signal H indicating the headers of the sectors and the period determined signal $PDS_1$ is a G/L signal which is also generated by the signal generator 305. The optical disk 301 includes a plurality of sectors 401, 403 and 405, where each of the sectors 401, 403 and 405 of the optical disk 301 includes header regions 402, 404 and 406, respectively. The header signal H, which is conventionally generated from the signal generator 305 as well known by the people skilled in the art, includes a plurality of specific regions $R_1$, $R_2$ and $R_3$ corresponding to the header regions 402, 404 and 406 respectively. For DVD-RAM disks, the header signal H is commonly called an IDGATE signal. The G/L signal that is also conventionally generated from the signal generator 305 as well known by the people skilled in the art, also includes a rising edge $E_1$ and a falling edge $E_2$ indicating two adjacent G/L switching points of the optical disk 301. As known to people skilled in the art, the distance between the two adjacent G/L switching points indicates that disk is rotated for one revolution. The counter 307 generates a counting number according to the header signal H and the G/L signal. As shown in FIG. 4 (b), the character V is incremented by 1 when regions $R_1$, $R_2$ and $R_3$ occur, and is reset to an initial value, 0 for example, while the edges $E_1$ and $E_2$ occur. By this way, the counter 307 counts the number of the sectors P in a revolution of a current track. The number P is latched to the latch 309 shown in FIG. 4 (a). The processing unit 315 receives the number P of the sectors in one revolution of the current track and subtracts the number P from a predetermined number to get a calculating result representing the location of the optical pick-up head on the optical disk. As shown in FIG. 4 (a), if the optical disk 301 is a DVD-RAM, its format is divided into 35 annular zones. Each zone has 1888 tracks, which are 944 land tracks and 944 groove tracks, and each track is divided into sectors. For example, each revolution (a land track or a groove track) in the innermost zone 317, or called zone 0, of the optical disk 301 includes 25 sectors, the revolution in the next zone 319, zone 1, includes 26 sectors, the revolution in the zone 321, zone 2, includes 27 sectors, and the remaining revolutions all follow the same rules. Thus, if the number of the sectors counts by the counter 315 is 32, the zone on which the optical pick-up head 303 locates will be the zone 7 (32-25). Though different kinds of optical disks will have a different number of sectors in a revolution of the innermost zone, the location of the optical pick-up head can still be obtained by using this concept.

According to this embodiment, the zone number could be detected by $$\text{Zone Number} = P - Z \qquad \text{Equation (1)}$$

Where P means the counting number during a revolution, and Z is the number of sectors of one revolution in the inner most zone of the optical disk.

Figure 5A:
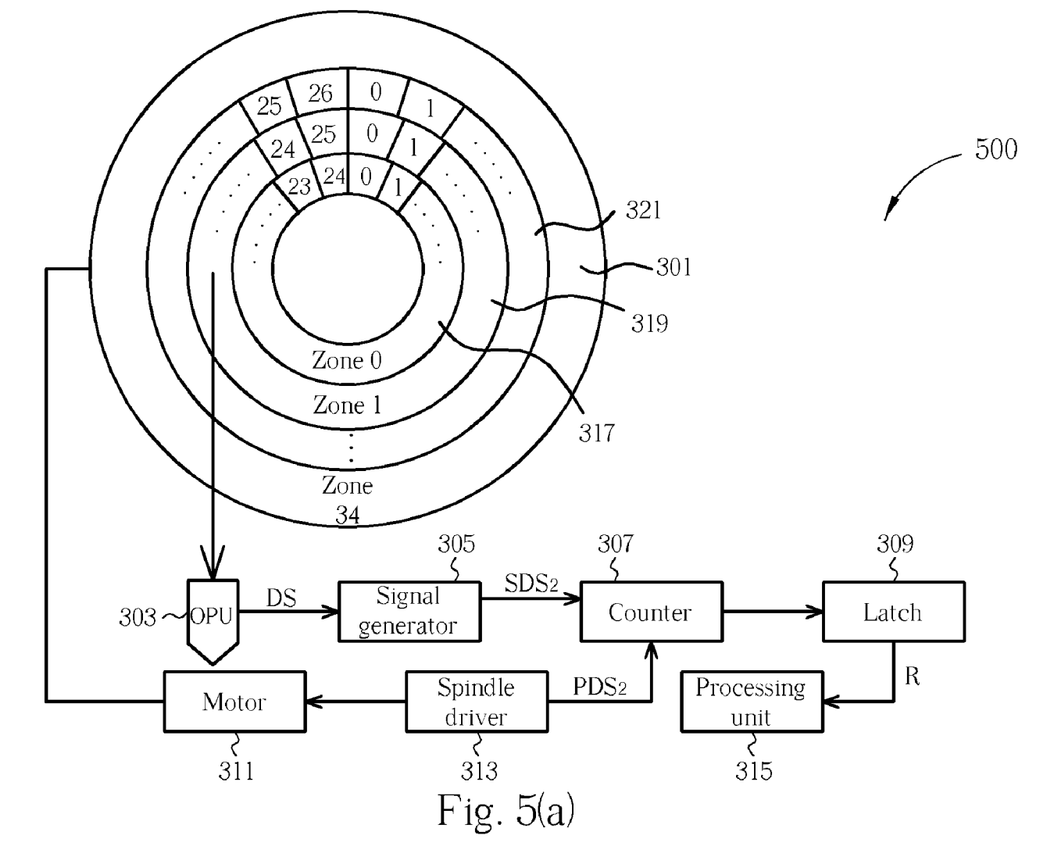
Figure 5B:
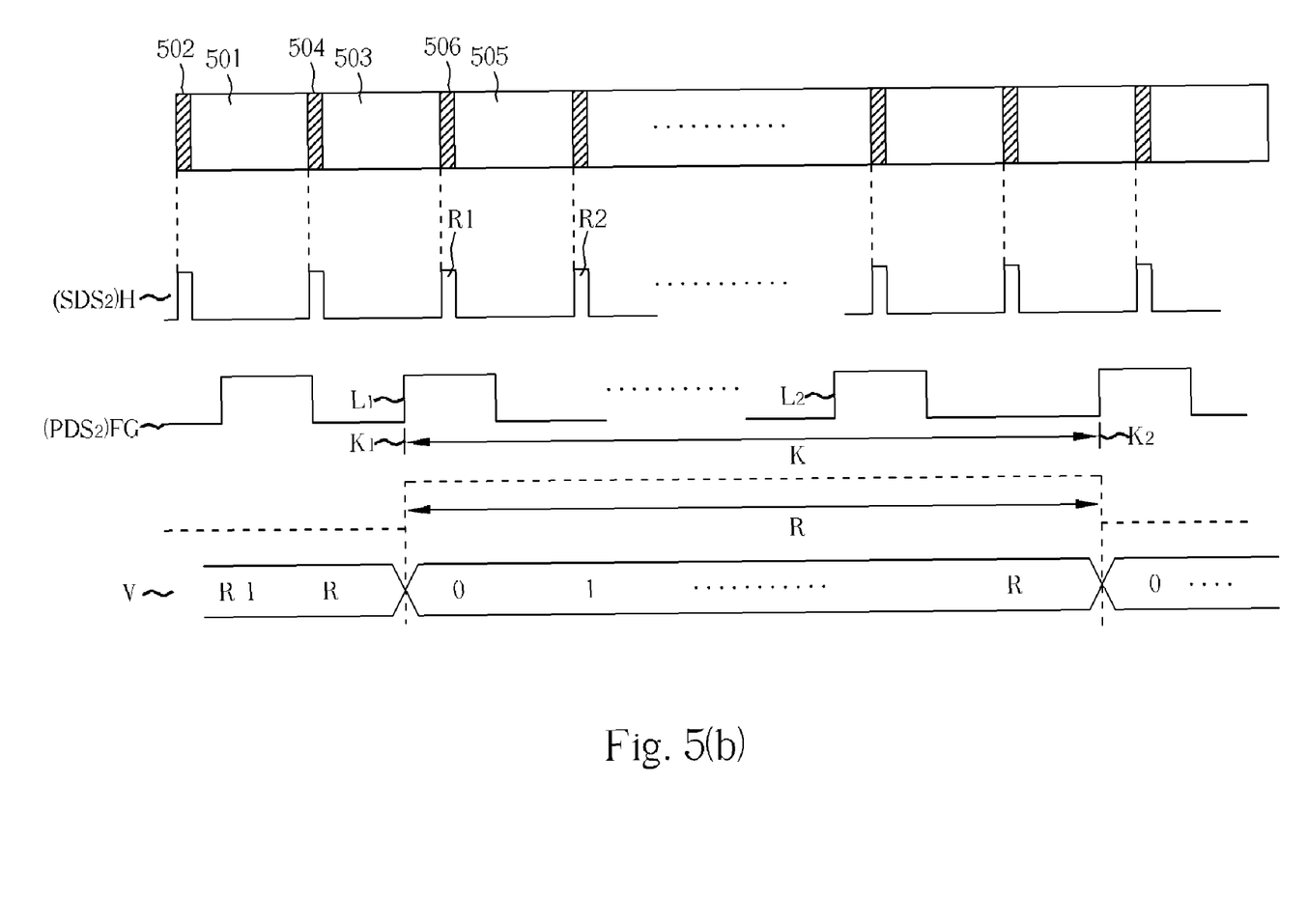

FIG. 5 (a) is a block diagram illustrating a system 500 for detecting the location of the optical pick up head according to the second embodiment of the system shown in FIG. 3 (a) and the method shown in FIG. 3 (b). FIG. 5 (b) is a schematic diagram illustrating the signals and the operation of which corresponding to the system shown in FIG. 5 (a). Please jointly refer to FIG. 5 (a) and FIG. 5 (b) to understand the present invention more clearly.

Comparing with the system 300 shown in FIG. 3, the system 500 further includes a motor 311 and a spindle driver 313. As shown in FIG. 5(b), the sector determined signal $SDS_2$ is a header signal H indicating the headers of the sectors and the period determined signal $PDS_2$ is a FG signal from the spindle driver 313. The function of the header signal H is the same as described before, so it is omitted for brevity. The motor rotating signal FG includes a plurality of rising edges $L_1, L_2 \ldots$ etc. In this embodiment, the FG signal is used for indicating that the optical disk 301 rotate a revolution according to the rising edges $L_1, L_2, \ldots$ etc. After the relation ship between the FG signal and the rotation of the optical is determined, the counter 307 can calculate the number of the sectors in a revolution.

Take this embodiment for example, there are K rising edges in a revolution of the optical disk, thus if K rising edges occur, it is known that a full rotation of the optical disk 301 is performed. As shown in FIG. 5(b), the character R indicates a revolution of the optical disk, that is the number of the headers in a revolution of the optical disk 301, and K indicates the number of the rising edges occurring in a full rotation of the optical disk 301 and is determined by a hole sensor of motor 311 and the spindle driver 313. The counter 307 generates a counting number according to the header signal H and the FG signal. As shown in FIG. 5 (b), the character V is incremented by 1 when regions $R_1$, and $R_2$ occur, and is reset to an initial value, 0 for example, while the edges $K_1$ and $K_2$ occur. The number of regions R1 and R2 ... between edges $K_1$ and $K_2$ indicate the number of headers occur in a in a revolution of a current track. By this way, the counter 307 counts the number of the sectors R in a revolution of a current track. The number R is latched to the latch 309 shown in FIG. 5 (a). The processing unit 315 receives the number R of the sectors in one revolution of the current track and subtracts the number R from a predetermined number to get a calculating result representing the location of the optical pick-up head on the optical disk.

According to this embodiment, if the relationship between the FG signal and the full rotation is obtained (i.e. k rising edges occur in a full rotation of the optical disk), then the timing of a full rotation of the optical disk can be easily obtained according to FG signal. The number of the sectors on which the optical pick-up head locates can then be obtained. After that, the location of the optical pick-up head can be determined according to the number of sectors in the revolution on which the optical pick-up head locates, as described above.

It should be noted that, although the number of sectors of a revolution is detected according to the header regions in the above-mentioned embodiments, this does not mean that the scope of the invention is limited to the usage of the header regions. People skilled in the art can use any other characteristics of an optical disk that can indicate the sectors in order to detect the number of sectors of one revolution.

Figure 6A:
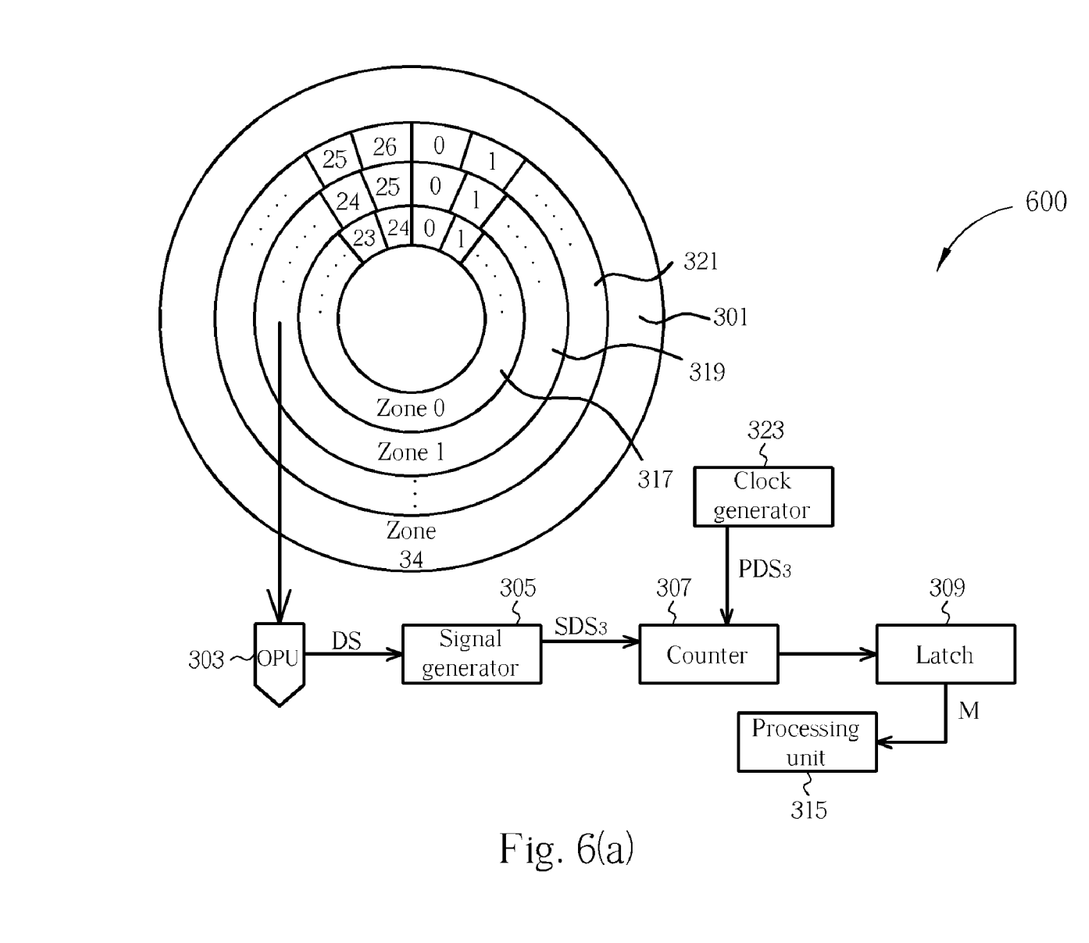
Figure 6B:
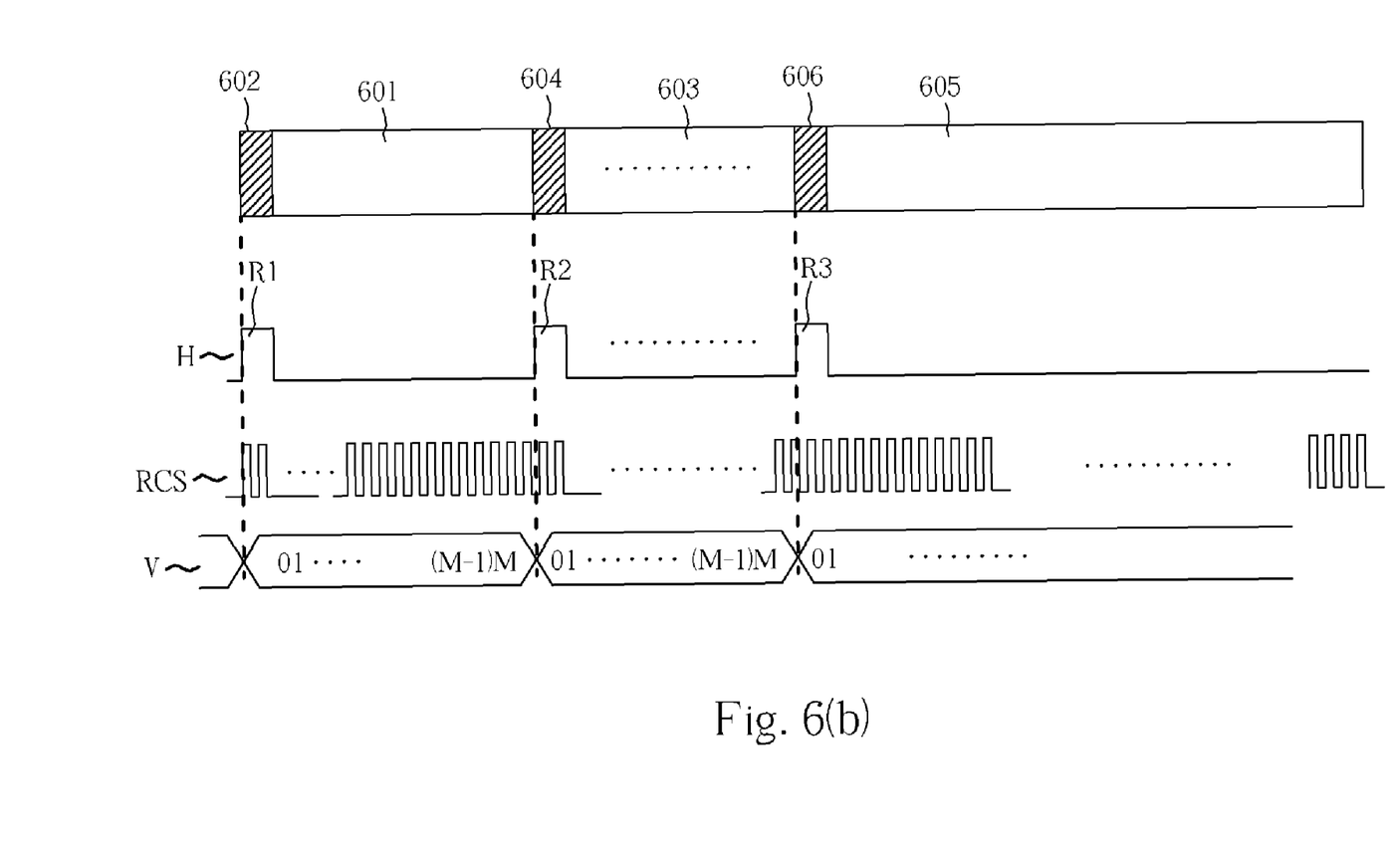

FIG. 6 (a) is a block diagram illustrating a system 600 for detecting the location of the optical pick up head according to the third embodiment of the system shown in FIG. 3 (a) and the method shown in FIG. 3 (b). Comparing with the system 400 shown in FIG. 4(a), the system 600 further includes a clock generator 323. FIG. 6 (b) is a schematic diagram illustrating the signals and the operation of which corresponding to the system shown in FIG. 6 (a). Please jointly refer to FIG. 6(a) and FIG. 6(b) to understand the present invention more clearly.

As shown in FIG. 6(a) and FIG. 6 (b), the sector determined signal $SDS_3$ is a header signal H indicating the headers of the sectors and the period determined signal $PDS_3$ is a reference clock signal generated by a clock generator 323. The function of the header signal is the same as described before, so it is omitted for brevity. In this case, the counter 307 generates a counting number according to the header signal H and the reference clock signal RCS. As shown in FIG. 6(b), the character V is incremented by 1 when one pulse of the reference clock signal RCS occurs, wherein the pulses of the reference clock signal RCS correspond to the frequency of the reference clock signal. By this way, the counter 307 counts the number of the clocks M between two headers of a current track. The number M is latched to the latch 309 shown in FIG. 6(a).

The processing unit 315 receives the number M of the clocks in between two headers, a frequency of the clock from the clock generator 323, and a frequency of the spindle motor from the spindle driver 315, and performs equation (2) to get a calculating result representing the location of the optical pick-up head on the optical disk. The location of the optical pick-up head can be determined according to the following equation:

$$\text{Zone Number} = \frac{f_s}{M \times f_{spindle}} - X \qquad \text{Equation (2)}$$

In this equation (2), $f_s$ represents the frequency of the reference clock signal RCS, $f_{spindle}$ represents the rotating speed of the optical disk and X is a predetermined value. For this embodiment, the X is 25, the number of sectors of the innermost zone of DVD-RAM disk. According to the description above, since fs/M and $f_{spindle} \times (N+25)$ (where N indicates the location, zone number for example, on which the optical pick-up head locates) both indicate that the sectors appear in one second, then $$\frac{fs}{M} = f_{spindle} \times (N+25),$$

and equation (2) can be obtained accordingly.

It should be noted that, although the number of zone is detected according to the header regions in the above-mentioned embodiment, this does not mean that the scope of the invention is limited to the use of header regions. Persons skilled in the art can use any other characteristics of an optical disk that can indicate the sector in order to detect the zone number of the optical pick-up head located.

Figure 7A:
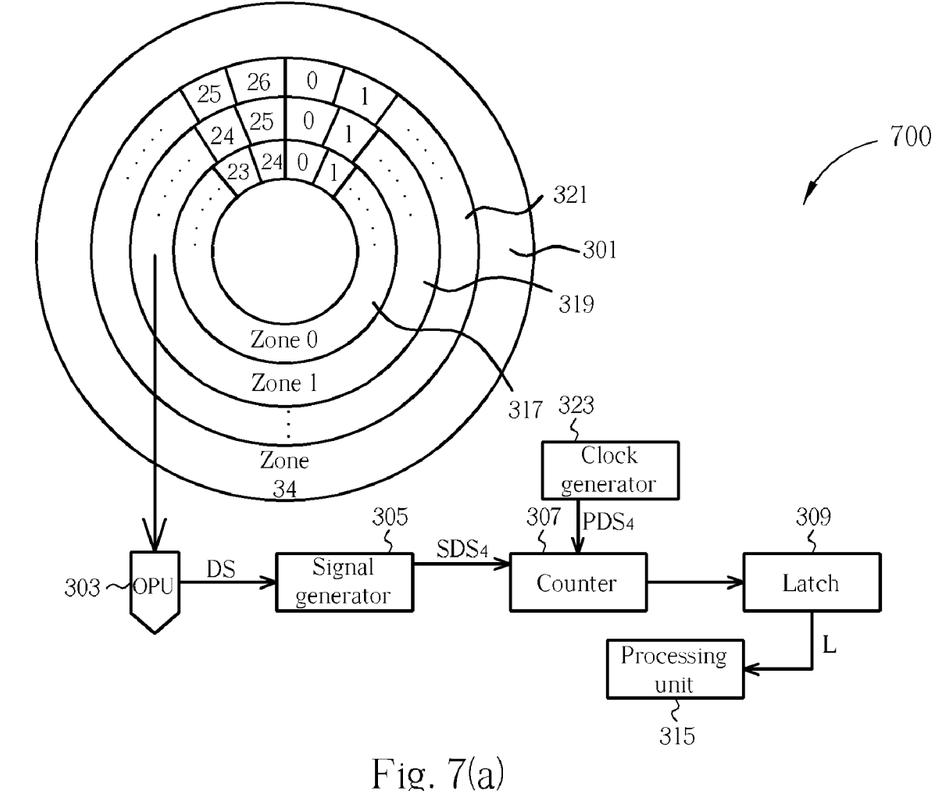
Figure 7B:
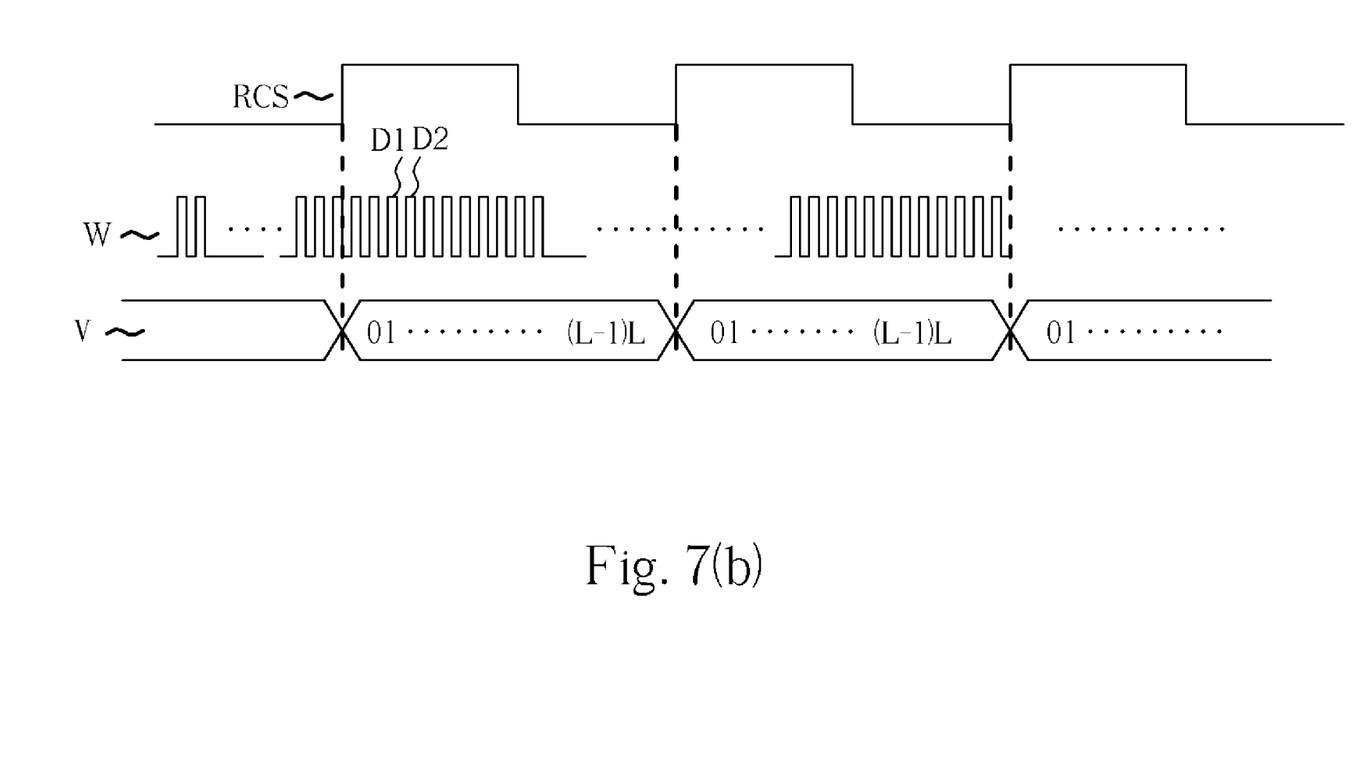

FIG. 7 (a) is a block diagram illustrating a system 700 for detecting the location of the optical pick up head according to the fourth embodiment of the system shown in FIG. 3 (a) and the method shown in FIG. 3 (b). Comparing with the system 500 shown in FIG. 5(a), the system 700 further includes a clock generator 323. FIG. 7 (b) is a schematic diagram illustrating the signals and the operation of which corresponding to the system shown in FIG. 7 (a). Please jointly refer to FIG. 7(a) and FIG. 7(b) to understand the present invention more clearly.

As shown in FIG. 7(a) and FIG. 7(b), the sector determined signal $SDS_4$ is a wobble signal W with a plurality of pulses $P_1$, $P_2$ and is generated by the signal generator 305, and the period determined signal $PDS_4$ is a reference clock signal RCS and is generated by the clock generator 323. In this case, the counter 307 generates a counting number according to the wobble signal W and the reference clock signal RCS. As shown in FIG. 7(b), the character V is incremented by 1 when one pulse of the wobble signal occurs and is reset to an initial value, 0 for example, when the rising edge or falling edge of the reference clock signal RCS occurs. That is, the counting number L indicates the number of wobbles that occur in a period of the reference signal RCS.

The processing unit 315 receives the number L of the wobbles between two clocks or a period of the clocks, a frequency of the clock from the clock generator 323, and performs equation (3) to get a calculating result representing the location of the optical pick-up head on the optical disk. Thus, the location of the optical pick-up head is determined by the following equation:

$$\frac{f_k \times L}{K \times f_{spindle}} - Y \qquad \text{Equation (3)}$$

In equation (3), $f_k$ represents the frequency of the reference clock signal RCS, L represents the number of wobbles in a period of the reference clock signal, K represents the number of wobbles occurring in a sector, where for DVD-RAM, K=232, $f_{spindle}$ represents the rotation speed of the optical disk and Y is a predetermined value. For this embodiment, Y represents the number of sectors of the innermost revolution of the optical disk (for DVD-RAM, Y=25). Since $f_k \times L$ and $f_{spindle} \times K \times (N+25)$ both indicate the number of wobbles occurring in one second, $f_k \times L = f_{spindle} \times K \times (N+25)$, and then equation (2) can be obtained accordingly.

It should be noted that, although the above-mentioned embodiments utilize a header signal and wobble signal to detect the location of the optical pick-up head, this is not intended to limit the scope of the present invention. Persons skilled in the art can easily use any other specific signals according to information stored on an optical disk and the teaching of the invention to obtain the same result.

According to the system and method described above, the location of the optical pick-up head can be easily and accurately detected, and the PLL frequency and the rotation speed can then be set according to the location of the optical pick-up head. Thus, the above-mentioned related art problems can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system for detecting a location of an optical pick-up head on an optical disk, the optical disk comprising a plurality of sectors and the optical pick-up head emitting light to the optical disk and detected the reflected light from the optical disk, the system comprising:
    a signal generator coupled to the optical pick-up head for receiving a detecting signal from the optical pick-up head to generate a sector determined signal;
    a counter, coupled to the signal generator for receiving the sector determined signal and a period determined signal for counting a number according to the sector determined signal and the period determined signal; and
    a processing unit for receiving the number and calculating the location of the optical pick-up head accordingly.

2. The system of claim 1, wherein each sector includes a header, and the sector determined signal is an IDGATE signal for determining a sector.

3. The system of claim 1, wherein the optical disk comprises a plurality of groove tracks and land tracks, the groove tracks and the land tracks are spaced therein between, the period determined signal is a G/L signal for determining an interface between a land track and a groove track, and the counter receives the G/L signal and counts the number of the sectors in a revolution of a current groove/land track.

4. The system of claim 3, wherein the processing unit receives the number of the sectors in the revolution of the current track and subtracts the number from a predetermined numeral to get a calculating result representing the location of the optical pick-up head on the optical disk.

5. The system of claim 1, wherein the system further includes a spindle driver for driving the operation of a motor for rotating the optical disk and generating a Frequency Generator (FG) signal as the period determined signal, where the FG signal is used for determining that the optical disk rotates one revolution and the counter receives the FG signal and counts the number of the sectors in a revolution.

6. The system of claim 5, wherein the processing unit receives the number of the sectors in the revolution and subtracts the number from a predetermined numeral to get a calculating result representing the location of the optical pick-up head on the optical disk.

7. The system of claim 1, wherein the period determined signal is a reference clock signal which has a predetermined frequency, and the counter receives the clock signal and counts the number of the clocks in a sector determined by the sector determined signal.

8. The system of claim 7, wherein the processing unit receives the number of the clocks in the sector and determines the location of the optical pick-up head on the optical disk by $$\frac{f_s}{M \times f_{spindle}} - X,$$

where $f_s$ indicates the frequency of the reference clock signal, M indicates the number of the clocks, $f_{spindle}$ indicates the rotating speed of the optical disk and X is a predetermined value.

9. The system of claim 1, wherein the period determined signal is a reference clock signal which has a predetermined frequency and the sector determined signal is a wobble signal for determining at least a period of the reference clock signal, and the counter receives the wobble signal and the reference clock signal to counts the number of the wobble signals in the period of the reference clock signal.

10. The system of claim 9, wherein the processing unit receives the number of the clocks in the period of the reference clock signal and determines the location of the optical pick-up head on the optical disk by $$\frac{f_k \times L}{K \times f_{spindle}} - Y,$$

where $f_k$ indicates the frequency of the reference clock signal, L indicates the number of wobbles in a period of the reference clock signal, K indicates the number of the clocks between the period of the reference clock signal, $f_{spindle}$ indicates the rotation speed of the optical disk and Y is a predetermined numeral.

11. The system of claim 1, wherein the system is activated when the optical pick-up head slips to the location.

12. A method for detecting a location of an optical pick-up head on an optical disk, the optical disk comprising a plurality of sectors and the optical pick-up head emitting light to the optical disk and detected the reflected light from the optical disk, the method comprising:
  (a) receiving a detecting signal from the optical pick-up head to generate a sector determined signal;
  (b) counting a number according to the sector determined signal and a period determined signal; and
  (c) receiving the number and calculating the location of the optical pick-up head accordingly.

13. The method of claim 12, wherein each sector includes a header, and the sector determined signal is an IDGATE signal for determining a sector.

14. The method of claim 12, wherein the optical disk comprises a plurality of groove tracks and land tracks, the groove tracks and the land tracks are spaced therein between, the period determined signal is a G/L signal for determining an interface between a land track and a groove track, and the step (b) further receives the G/L signal and counts the number of the sectors in a revolution of a current groove/land track.

15. The method of claim 14, wherein the step (c) receives the number of the sectors in the revolution of the current groove/land track and subtracts the number from a predetermined numeral to get a calculating result representing the location of the optical pick-up head on the optical disk.

16. The method of claim 12, wherein the method further senses the operation of a motor for rotating the optical disk to generate a Frequency Generator (FG) signal as the period determined signal, where the FG signal is used for determining that the optical disk rotates one revolution and the counter receives the FG signal and counts the number of the sectors in a revolution.

17. The method of claim 16, wherein the step (c) receives the number of the sectors in the revolution and subtracts the number from a predetermined numeral to get a calculating result representing the location of the optical pick-up head on the optical disk.

18. The method of claim 12, wherein the period determined signal is a reference clock signal, which has a predetermined frequency, and the step (b) receives the clock signal and counts the number of the clocks in a sector determined by the sector determined signal.

19. The method of claim 18, wherein the step (c) receives the number of the clocks in the sector and determines the location of the optical pick-up head on the optical disk by $$\frac{f_s}{M \times f_{spindle}} - X,$$

where $f_s$ indicates the frequency of the reference clock signal, M indicates the number of the clocks, $f_{spindle}$ indicates the rotating speed of the optical disk and X is a predetermined value.

20. The method of claim 12, wherein the period determined signal is a reference clock signal which has a predetermined frequency and the sector determined signal is a wobble signal for determining at least a period of the reference clock signal, and the counter receives the wobble signal and the reference clock signal to counts the number of the wobble signals in the period of the reference clock signal.

21. The method of claim 20, wherein the step (c) receives the number of the clocks in the period of the reference clock signal and determines the location of the optical pick-up head on the optical disk by $$\frac{f_k \times L}{K \times f_{spindle}} - Y,$$

where $f_k$ indicates the frequency of the reference clock signal, L indicates the number of wobbles in a period of the reference clock signal, K indicates the number of the clocks between the period of the reference clock signal, $f_{spindle}$ indicates the rotation speed of the optical disk and Y is a predetermined numeral.

22. The method of claim 12, wherein the method is performed when the optical pick-up head slips to the location.

* * * * *